（12) United States Patent
Nomura

(10) Patent No.: US 8,037,242 B2
(45) Date of Patent: Oct. 11, 2011

(54) CONTENTS DELIVERY SYSTEM USING CACHE AND DATA REPLICATION

(75) Inventor: Ken Nomura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 475 days.

(21) Appl. No.: 12/339,292

(22) Filed: Dec. 19, 2008

(65) Prior Publication Data
US 2010/0100697 A1 Apr. 22, 2010

(30) Foreign Application Priority Data
Oct. 20, 2008 (JP) .................................. 2008-270133

(51) Int. Cl.
*G06F 12/00* (2006.01)
(52) U.S. Cl. ........................................ 711/113; 711/144
(58) Field of Classification Search .......................... None
See application file for complete search history.

(56) References Cited

U.S. PATENT DOCUMENTS
6,389,012 B1 5/2002 Yamada et al.

2008/0163064 A1* 7/2008 Swildens et al. ............. 715/736
2009/0007241 A1* 1/2009 Tewari et al. .................... 726/4

FOREIGN PATENT DOCUMENTS
JP 11-120014 4/1999

* cited by examiner

*Primary Examiner* — Than Nguyen
(74) *Attorney, Agent, or Firm* — Brundidge & Stanger, P.C.

(57) ABSTRACT

An information processing apparatus is provided capable of effectively utilizing resources in data transmission processes executed by a plurality of control units. A contents delivery apparatus includes network IFs, control units, disk drives used by the respective control units, and cache areas in which content data read by the respective control units from the respective disk drives is temporarily stored. Upon receiving a content data delivery request from a terminal device, the control unit of the contents delivery apparatus checks whether the requested data is present in the cache area, and if it is present (cache hit), replicates the data to the disk drive used by any one of other control units to notify a portal server allocating a delivery destination so that it is well prepared for a new delivery request from the terminal device.

15 Claims, 16 Drawing Sheets

FIG. 8 TARGET VOLUME DETERMINATION PROCESS

FIG. 9

CACHE HIT MANAGEMENT TABLE

| BLOCK NUMBER | HIT TIMES | MEASUREMENT TIME | HIT RATE RANK | HIT INTERVAL |
|---|---|---|---|---|
| BLOCK NUMBER | HIT TIMES | MEASUREMENT TIME | HIT RATE RANK | HIT INTERVAL |
| BLOCK NUMBER | HIT TIMES | MEASUREMENT TIME | HIT RATE RANK | HIT INTERVAL |
| BLOCK NUMBER | HIT TIMES | MEASUREMENT TIME | HIT RATE RANK | HIT INTERVAL |

ACCESS STATUS MANAGEMENT TABLE

| DELIVERY APPA-RATUS ADDRESS | CONTENTS LIST | BIT RATE LIST | AVAILABLE DELIV-ERY BANDWIDTH | NUMBER OF ACCESSES |
|---|---|---|---|---|
| DELIVERY APPA-RATUS ADDRESS | CONTENTS LIST | BIT RATE LIST | AVAILABLE DELIV-ERY BANDWIDTH | NUMBER OF ACCESSES |
| DELIVERY APPA-RATUS ADDRESS | CONTENTS LIST | BIT RATE LIST | AVAILABLE DELIV-ERY BANDWIDTH | NUMBER OF ACCESSES |
| DELIVERY APPA-RATUS ADDRESS | CONTENTS LIST | BIT RATE LIST | AVAILABLE DELIV-ERY BANDWIDTH | NUMBER OF ACCESSES |

1301 — 1302 — 1303 — 1304 — 1305

1300

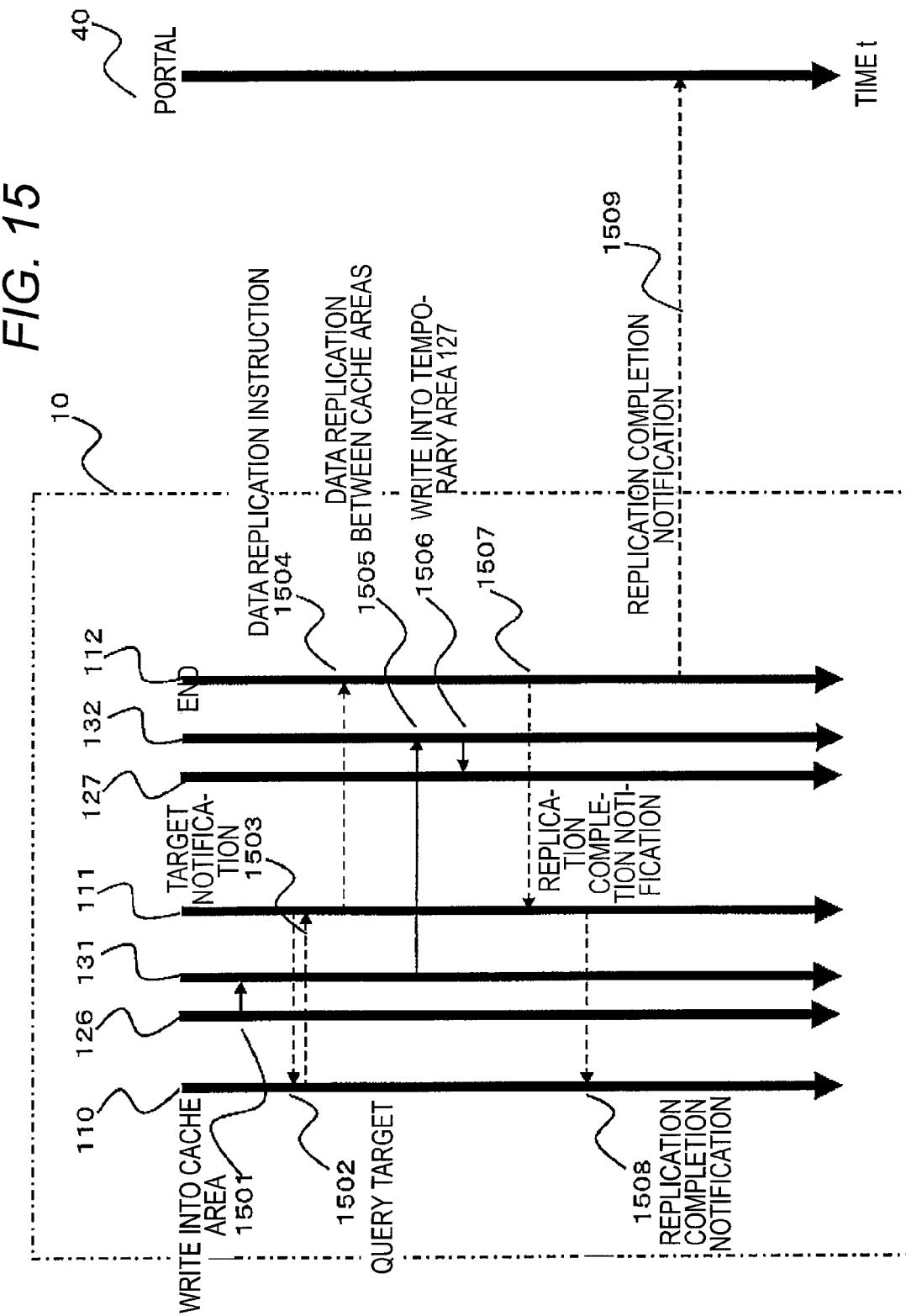

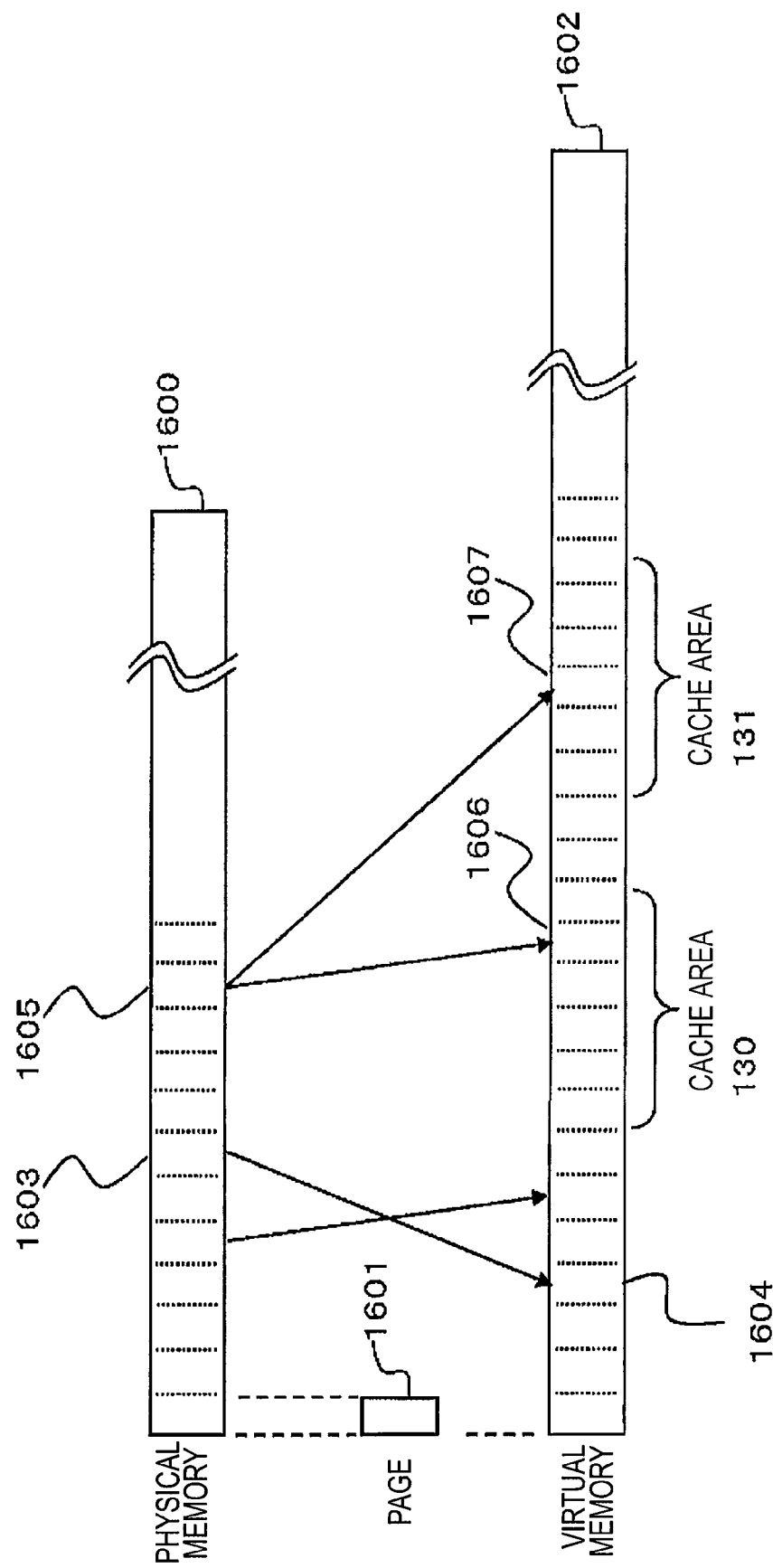

CONTENTS DELIVERY SYSTEM USING CACHE AND DATA REPLICATION

CROSS REFERENCES TO RELATED APPLICATIONS

This application relates to and claims priority from Japanese Patent Application No. 2008-270133, filed on Oct. 20, 2008, the entire disclosure of which is incorporated herein by reference.

BACKGROUND OF THE INVENTION

1. Field of the Invention

The present invention relates to an information processing system and a management method thereof, and more particularly, to an information processing system and a management method thereof capable of effectively utilizing resources in data transmission processes executed by a plurality of control units.

2. Description of the Related Art

With the recent deployment of multi-core processors or the like, it has become common that a single apparatus is controlled by a plurality of control units (processors). If the control unit is single, resources mounted on an apparatus, such as memory areas or hardware devices, can be inevitably uniformly managed by the control unit.

However, when the control unit becomes plural, it is necessary to distribute resources to be allocated to the respective control units. Therefore, a so-called distribution loss may occur in which a resource needed by an apparatus is assigned to another control unit and thus cannot be used.

As a typical conventional countermeasure to the distribution loss, a method of committing a process to another control unit when the resources fell short (reference should be made to, for example, Japanese Patent Application Laid-Open No. 11-120014) is provided.

However, in a contents delivery apparatus that delivers a large amount of data such as video or audio streams, the conventional method cannot solely eliminate or alleviate the distribution loss due to the following problems.

As a first problem, since the contents delivery apparatus is configured to transmit video data preliminarily stored in the disk drive to a network, when the read performance of a disk is not sufficient, it is difficult to eliminate resource shortage unless the video data is replicated to another disk. That is, when the resources fell short, since it is very difficult to obtain resources for eliminating the resource shortage, the resource distribution loss cannot be eliminated.

As a second problem, when the whole contents are preliminarily stored in the entire disk drives in order to solve the first problem, since the data size of the video contents is generally large, it may result in waste (distribution loss) of disk capacity. Particularly, since the popularity (access frequency) of the video contents greatly depends on its title and varies with time, it is difficult to accurately estimate access concentration to specific contents in advance.

That is, in the prior art or combination thereof, particularly, when a large amount of data such as video or audio streams is delivered by an apparatus having a number of control units such as a multi-core processor, it is difficult to eliminate the resource distribution loss caused by distributing the resources to the respective control units.

SUMMARY OF THE INVENTION

In order to solve these and other problems, according to an aspect of the present invention, there is provided an information processing system, which includes: an information processing apparatus operable to receive a data send request from an external device and send a target data of the data send request to the external device, the information processing apparatus including a plurality of control devices, each including: a storage device configured to store therein the target data of the data send request; a control unit configured to receive the data send request from the external device, read out the target data of the data send request from the storage device to which the control unit is assigned, and send the target data to the external device; and a cache memory configured to temporarily store therein at least a part of the data which the control unit has read from the storage device; and a management device operable to receive the data send request from the external device and assign the control device, in which the target data of the data send request is stored, as a data send request destination of the external device, wherein upon receipt of the data send request from the external device, the control unit makes a determination as to whether at least a part of the target data of the data send request results in a cache hit in the cache memory, replicates data associated with the target data stored in the storage device to another storage device assigned to another control unit when the determination result indicates the cache hit, and notifies the management device that the associated data has been replicated to another control device.

These and other objects and advantages of the present invention will become apparent to those of ordinary skill in the art in view of the following the preferred embodiments of the invention in conjunction with the accompanying drawings.

According to the present invention, it is possible to effectively utilize resources in data transmission processes executed by a plurality of control units.

BRIEF DESCRIPTION OF THE DRAWINGS

FIG. 9 is a view illustrating an example of a cache hit management table 900.

FIG. 13 is a view illustrating an example of an access status management table 1300.

FIG. 15 is a view illustrating the processes of a data replication operation from a temporary area 126 of disk drives 120 to 123 to a temporary area 127.

FIG. 16 is a view illustrating a process of replicating data held in cache areas 131 to 133 between the control units 110 to 113.

DESCRIPTION OF PREFERRED EMBODIMENTS

Hereinafter, an embodiment of the present invention will be described with the accompanying drawings.

First Embodiment

Figure 1:
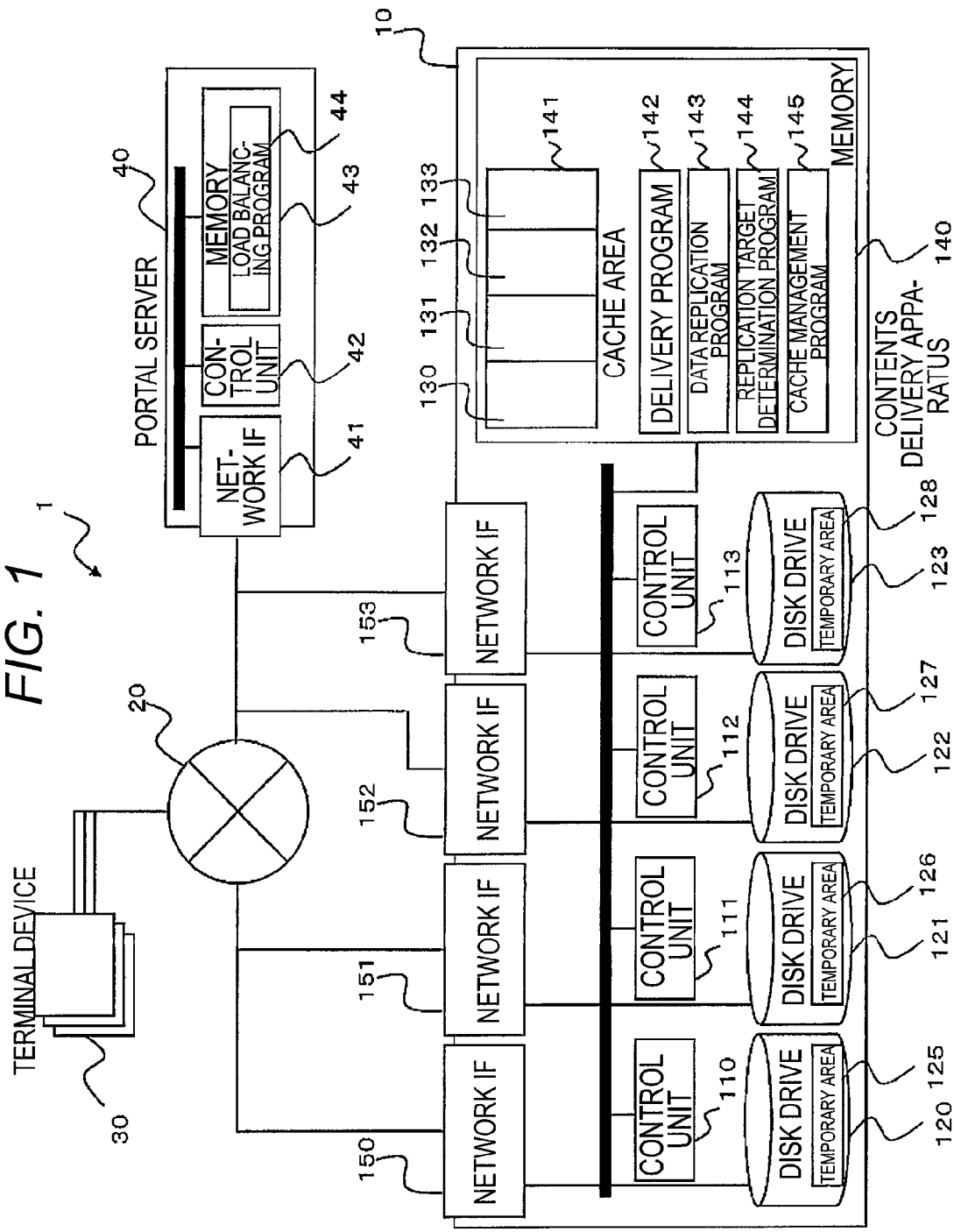
FIG. 1 is a view illustrating an information processing system 1 according to an embodiment of the present invention.

A description of an information processing system 1 according to a first embodiment of the present invention will be provided with reference to FIG. 1. FIG. 1 illustrates a configuration of the information processing system 1.

The information processing system 1 includes a contents delivery apparatus 10 (information processing apparatus), a terminal device 30, and a portal server 40 (management device and contents delivery request assigning device), in which the contents delivery apparatus 10 is communicably connected via a network 20 to the terminal device 30 and the portal server 40. The network 20 is a communication network, e.g., the Internet and the like.

The contents delivery apparatus 10 includes a plurality of control units 110 to 113, network interfaces 150 to 153 and disk drives 120 to 123, managed by the respective control units 110 to 113, and a memory 140. The control units 110 to 113, each of which has one CPU, form a multi-processor formed by the CPUs connected with each other via a bus. The respective control units 110 to 113 form one control device, together with the respective network interfaces 150 to 153, the respective disk drives 120 to 123, and cache areas 130 to 133 configured in the memory 140 (here, the cache areas will be later described).

The network interfaces (network IFs) 150 to 153 are communication adapters that allow the respective control units 110 to 113 to communicate with the terminal device 30 and the portal server 40 via the network 20.

The memory 140 is a main memory that is connected to the control units 110 to 113 through a communication path such as a bus. On the memory 140, a delivery program 142, a data replication program 143, a replication target determination program 144, and a cache management program 145 are read, expanded, and executed by the CPUs of the respective control units 110 to 113 from a state of being stored in the disk drives 120 to 123, for example, which will be described later, and the respective program elements execute respective processes of a delivery portion, a data replication portion, a replication target determination portion, and a cache management portion according to the present embodiment.

Moreover, a cache area 141 is provided in the memory 140, for temporarily storing data read by the respective control units 110 to 113 from the disk drives 120 to 123. The cache area 141 is divided into areas 130 to 133, which are respectively managed by the respective control units 110 to 113, and the control units 110 to 113 use the cache areas 130 to 133 assigned thereto as a disk cache.

The disk drive 120 to 123 are storage devices, e.g., a hard disk drive, and the like, in which the above-described various processing program elements such as the delivery program and content data such as video data or audio data are stored.

Moreover, temporary areas 125 to 128 are provided in the respective disk drives 120 to 123.

The temporary areas 125 to 128 are areas for temporarily holding data, in which old data is overwritten with new data in accordance with an algorithm such as LRU (Least Recently Used) so that the data can be repeatedly used. The temporary areas 125 to 128 may be secured as a fixed-size area on the disk drives 120 to 123, or simply, a free area of the disk drives 120 to 123 may be used as the temporary area without securing any definite area.

The terminal device 30 is a computer provided with applications such as a Web browser or a video playback software and a network IF allowing communication with the contents delivery apparatus 10 via the network 20, so that the video and audio data and the like stored in the contents delivery apparatus 10 are received via the network 20 and provided for user's entertainment.

As will be described later, the portal server 40 is provided with a function of balancing the load of access from the terminal device 30 to the contents delivery apparatus 10, and similar to the contents delivery apparatus 10, has a network IF 41, a control unit 42, and a memory 43.

The network interface 41 is a communication interface that allows the control unit 42 to communicate with the terminal device 30 and the contents delivery apparatus 10 via the network 20.

The control unit 42 includes a CPU or the like that executes a later-described load balancing program 44 and the like. The memory 43 is a storage device such as RAM or ROM, and functions as a main memory of the CPU of the control unit 42. On the memory 43, the load balancing program 44 stored in a non-illustrated auxiliary storage device or the like is read, expanded, and executed by the control unit 42, whereby the function of a load balancing processing portion according to the present embodiment is realized.

Figure 2:
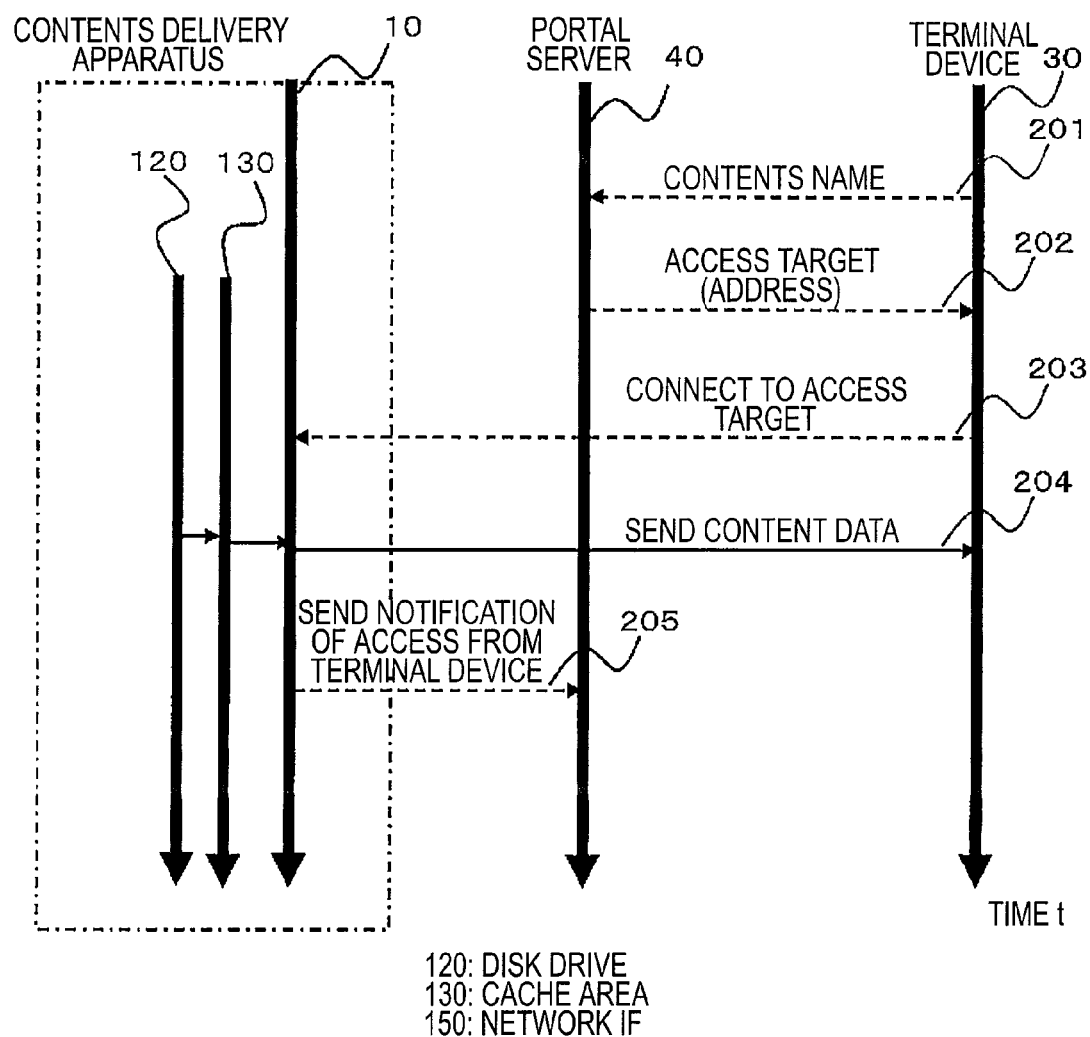
FIG. 2 is a view illustrating the overall operation processes of the information processing system 1.

Next, a description of a content data delivery process in the information processing system 1 having the above-described configuration according to the present embodiment will be provided. FIG. 2 is a sequence diagram illustrating the flow of a contents delivery process between the contents delivery apparatus 10, the terminal device 30, and the portal server 40. In the drawing, large downward arrows indicate components of the information processing system 1 according to the present embodiment: for example, the leftmost arrow indicates the disk drive 120 of the contents delivery apparatus 10. Moreover, Time t proceeds downward, and arrows that connect the large arrows in a horizontal direction indicate processes of sending/receiving information (data) between the respective components. Such an illustration method is equally applied in FIGS. 4, 6 and 15.

First, at step 201, a contents name which is an ID for uniquely identifying contents that a user of the terminal device 30 wishes to entertain is transmitted from the terminal device 30 to the portal server 40.

Next, at step 202, an access target address of one of the network IFs 150 to 153 corresponding to the control unit 110 to 113 that manages the disk drive 120 to 123, in which the contents requested by the terminal device 30 are stored, is sent to the terminal device 30 serving as a data send destination (content data delivery destination). In the example of FIG. 2, a case where the content data which is the contents desired by the user is stored in the disk drive 120 is illustrated.

At step 203, the terminal device 30 connects to the acquired access target and then receives the desired contents at step 204. In the example of FIG. 2, since the network IF 150 is the access target, the contents delivery apparatus 10 reads the content data from the disk drive 120 into the cache area 130 using the contents name received from the terminal device 30 and transmits the content data temporarily stored in the cache area 130 via the network IF 150.

Such series of processes are performed by a delivery portion that is implemented by the control unit 110 executing the delivery program 142 on the memory 140. In this time, when there is an additional access to the contents identified by the identical contents name from another terminal device 30 and the content data is still held in the cache area 130, a cache hit occurs. In such a case, the operation of reading the content data from the disk drive 120 to the cache area 130 is omitted.

When contents delivery starts, the control unit 110 of the contents delivery apparatus 10 notifies, at step 205, the portal server 40 that there was an access from the terminal device 30. At this time, the control unit 110 also provides information representing the status of the access that it is processing to the portal server 40. The information may include a variety of information items, which will be described with respect to FIG. 13, the number of sessions that it is processing, the type of accessed contents, and the like. In this way, the portal server 40 can be informed of the access status occurring at each access target (control unit 110 to 113), and thus, the load balancing can be performed with high accuracy.

Figure 3:
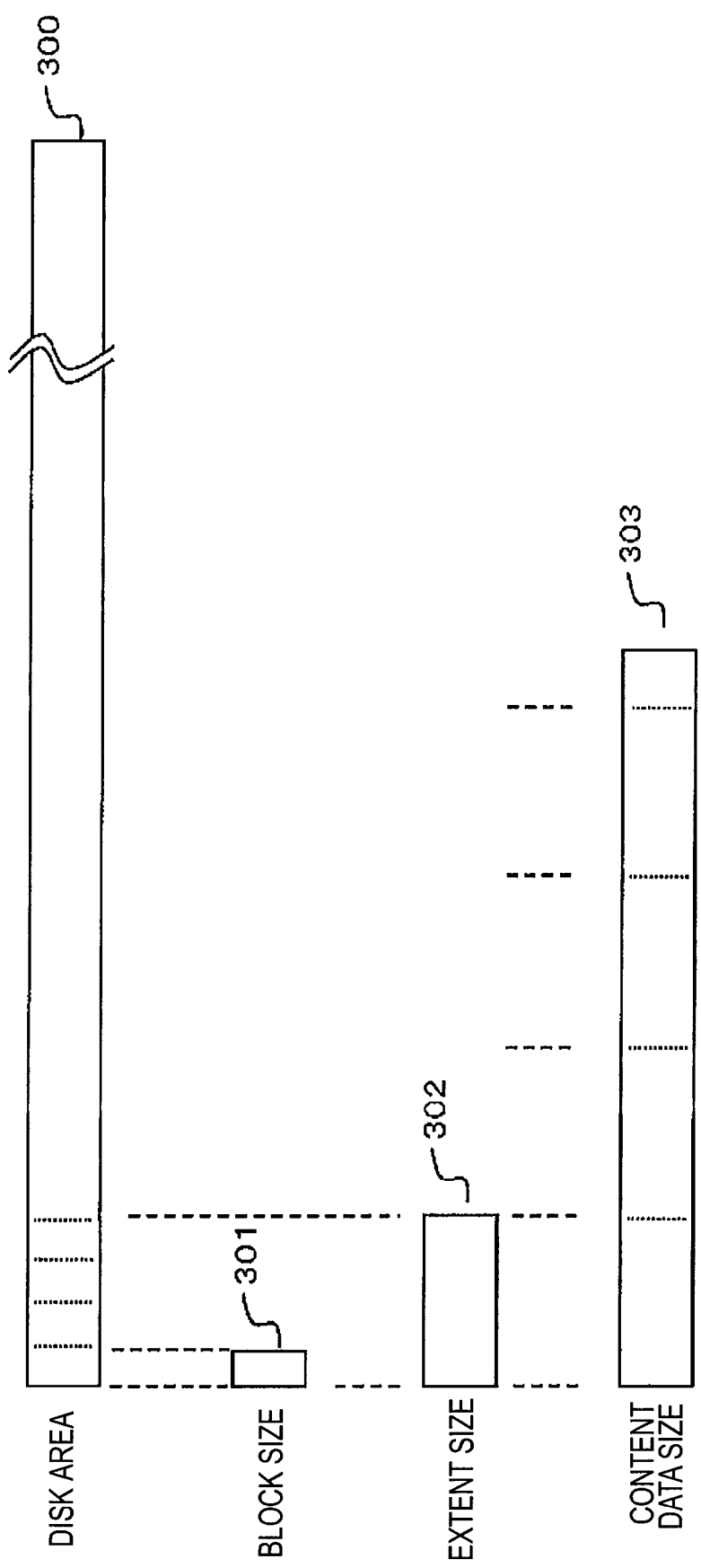
FIG. 3 is a schematic view illustrating the relationship between a disk area 300 and the size of data stored therein.

Next, a description of how the content data 303 is stored in the disk drive 120 to 123 will be provided. Referring to FIG. 3, how the content data 303 is stored in the disk drive 120 to 123 is schematically depicted.

In a disk area 300 on the disk drive 120 to 123, it is allowed to read and write data in units of a block size 301. Basically, although data written to the disk area 300 is not always written in consecutive blocks, when a file system with predetermined extents is used, it can be guaranteed that data corresponding to the length of at least an extent size 302 is written in consecutive blocks.

As is well known, the extent is a logically consecutive storage area that is written to an external storage device such as a hard disk and is used in the Linux (the registered trademark) having an XFS file system, for example. Therefore, when fragmented into the smallest fragments, the content data 303 is divided into a plurality of fragments each having the extent size 302 and a single data having a size smaller than the extent size and is then written to the disk area 300. The same statement can be applied when the content data is stored in the temporary areas 125 to 128 of the disk area 300.

Figure 4:
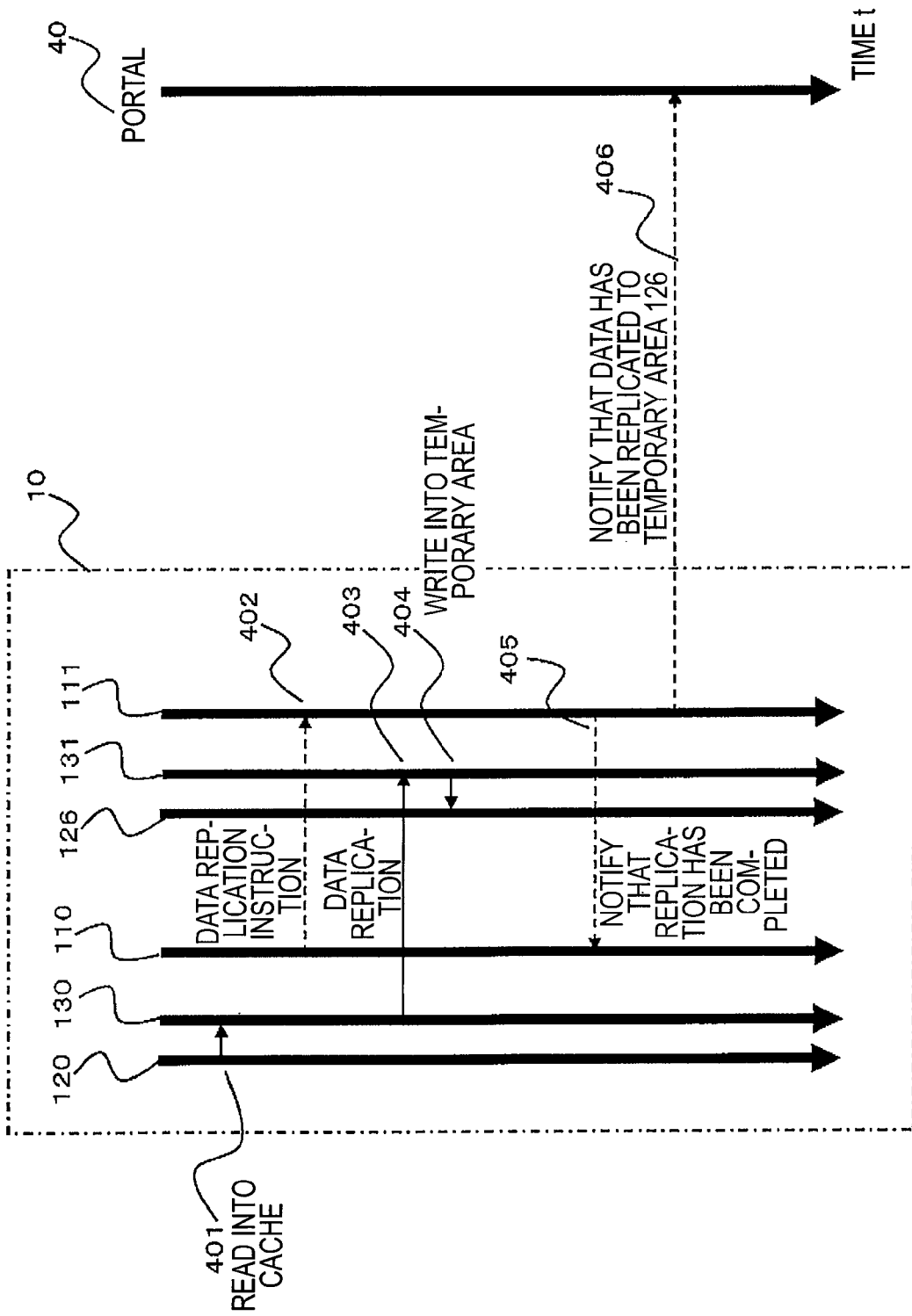
FIG. 4 is a view illustrating the processes of a data replication operation by the information processing system 1.

Next, a description of a content data replication process according to the present embodiment will be provided. FIG. 4 is a sequence diagram illustrating the flow of creating replica of the content data in the disk drive 120 to 123 managed by another control unit 110 to 113 when a cache hit has occurred within the contents delivery apparatus 10 with respect to the access from the terminal device 30.

First, the state where the content data is read from the disk drive 120 to the cache area 130 is initialized (step 401). At this time, when a cache hit has occurred, the control unit 110 instructs another control unit 111 to replicate the content data on the cache area 130 to the cache area 131 managed by the control unit 111 (step 402): here, the another control unit is described as being the control unit 111 although the another control unit may be any of the control units 111 to 113 other than the control unit 110. Instructing the control unit 111 being the replication target to execute the replication process is to reduce the processing load of the control unit 110 being the replication source since the control unit 110 is actually processing the access from the terminal device 30.

The process of selecting the control unit 111 from among other control units 111 to 113 is performed by a replication target determination portion that is implemented by the control unit 110 executing the replication target determination program 144 on the memory 140.

The control unit 111 replicates the content data from the cache area 130 to the cache area 131 (step 403) and writes the content data to the temporary area 126 of the disk drive 121 (step 404). This series of operations are performed by a data replication portion that is implemented by the control unit 111 executing the data replication program 143 on the memory 140.

Then, the completion of the replication is notified to the control unit 110 (step 405). Moreover, the portal server 40 is notified that the content data has been replicated to the temporary area 126 of the disk drive 121 managed by the control unit 111 (step 406).

In this way, when there is another access request to the contents from the terminal device 30, the portal server 40 is able to output, as the access target, the network IF 151 managed by the control unit 111 as well as the network IF 150 managed by the control unit 110. As a consequence, the access can be distributed to a plurality of control units 110 to 113, and thus, the cache hit rate in each of the control units 110 to 113 with respect to the content data can be lowered.

As for the replication of the cache hit content data, only data of the content data blocks, stored in the cache area 130 to 133 may be replicated, or the entire data of a file including the cache hit data may be replicated. Alternatively, when the content data is divided and stored as a plurality of data files, the plurality of data files which are associated with each other as parts of single content data may be replicated. In this specification, in addition to the cache hit data, the content data stored in the disk drives 120 to 123, and data associated with the content data used for reproduction or the like of the content data are sometimes collectively referred to as "associated data."

Such a content data replication process can achieve the same effect when the entire content data blocks are stored in the cache area 130. On the other hand, for example, when the control unit 110 is delivering data such as video data (the content of which is typically movie contents) delivered in a streaming manner, having such a large size that only parts of the content data blocks can be stored in the cache area 130, it is possible to achieve a prominent effect of preventing concentration of the access from the terminal device 30 to the disk drive 120 assigned to the control unit 110 to thereby reduce the delivery load to the control unit 110.

Moreover, as for the notification to the portal server 40 at steps 405 and 406, the notification may be sent prior to the completion of the data replication at a time point when the replication instruction is issued from the control unit 110 to 113 serving as the replication source to the control unit 110 to 113 serving as the replication target. Furthermore, the portal server 40 may be notified that the data is available at a time point when the content data has been replicated from the cache area 130 to the cache area 131.

Figure 5:
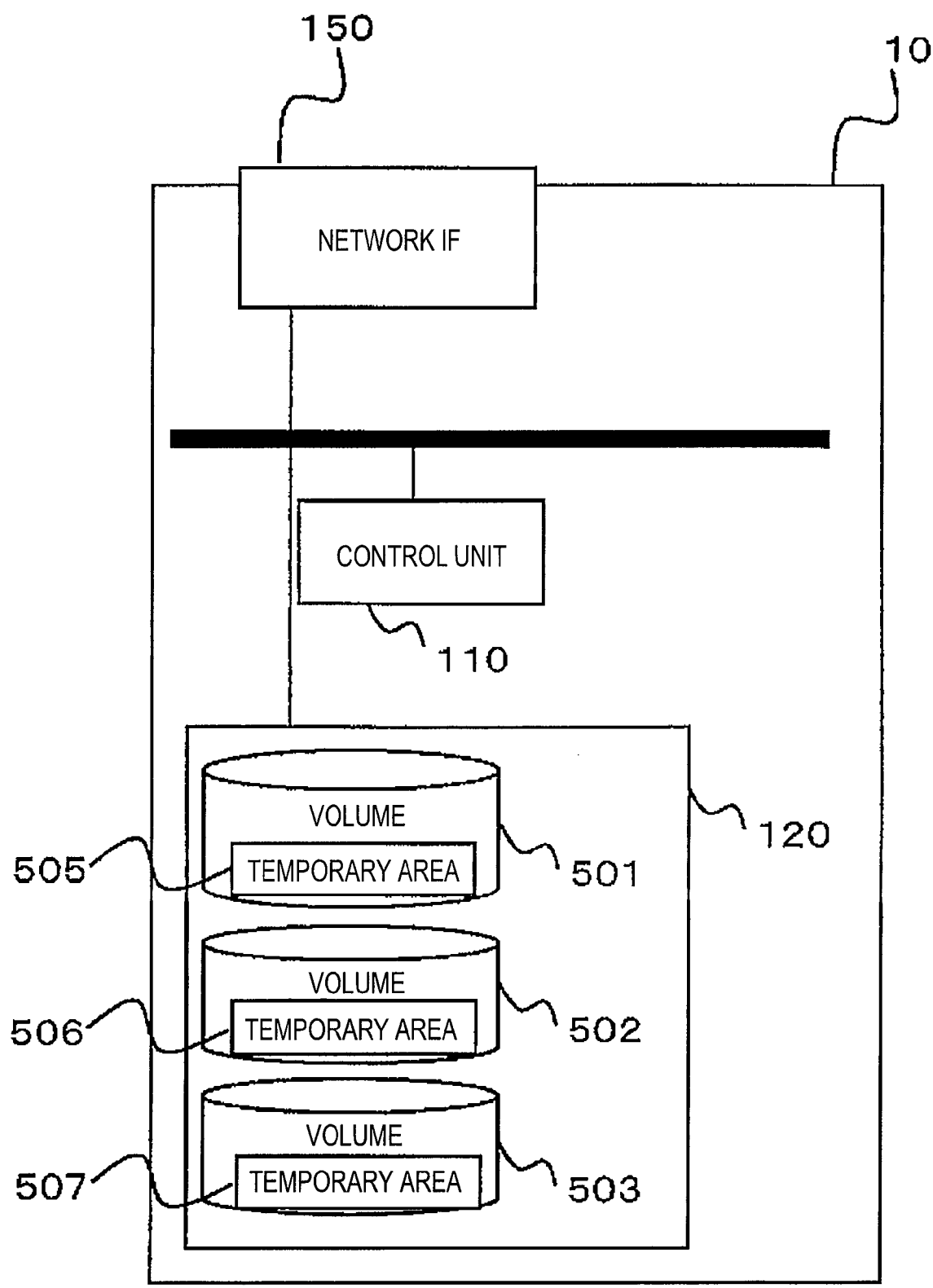
FIG. 5 is a schematic view illustrating a configuration in which a plurality of volumes 501 to 503 is connected to one of control units 110 to 113.

Next, a description of a modified example of the disk drive 120 to 123 will be provided. Referring to FIG. 5, a configuration is illustrated in which the disk drive 120 to 123 connected to one of the control units 110 to 113 has a plurality of volumes 501 to 503 not a single volume. When a plurality of volumes (disk areas) 501 to 503 is provided to one control unit 110, the respective volumes 501 to 503 have temporary areas 505 to 507. Although the number of storage areas available as the replication target of the content data decreases, the operation of the present embodiment can be performed even when the temporary areas 505 to 507 are not provided to all of the volumes 501 to 503.

Figure 6:
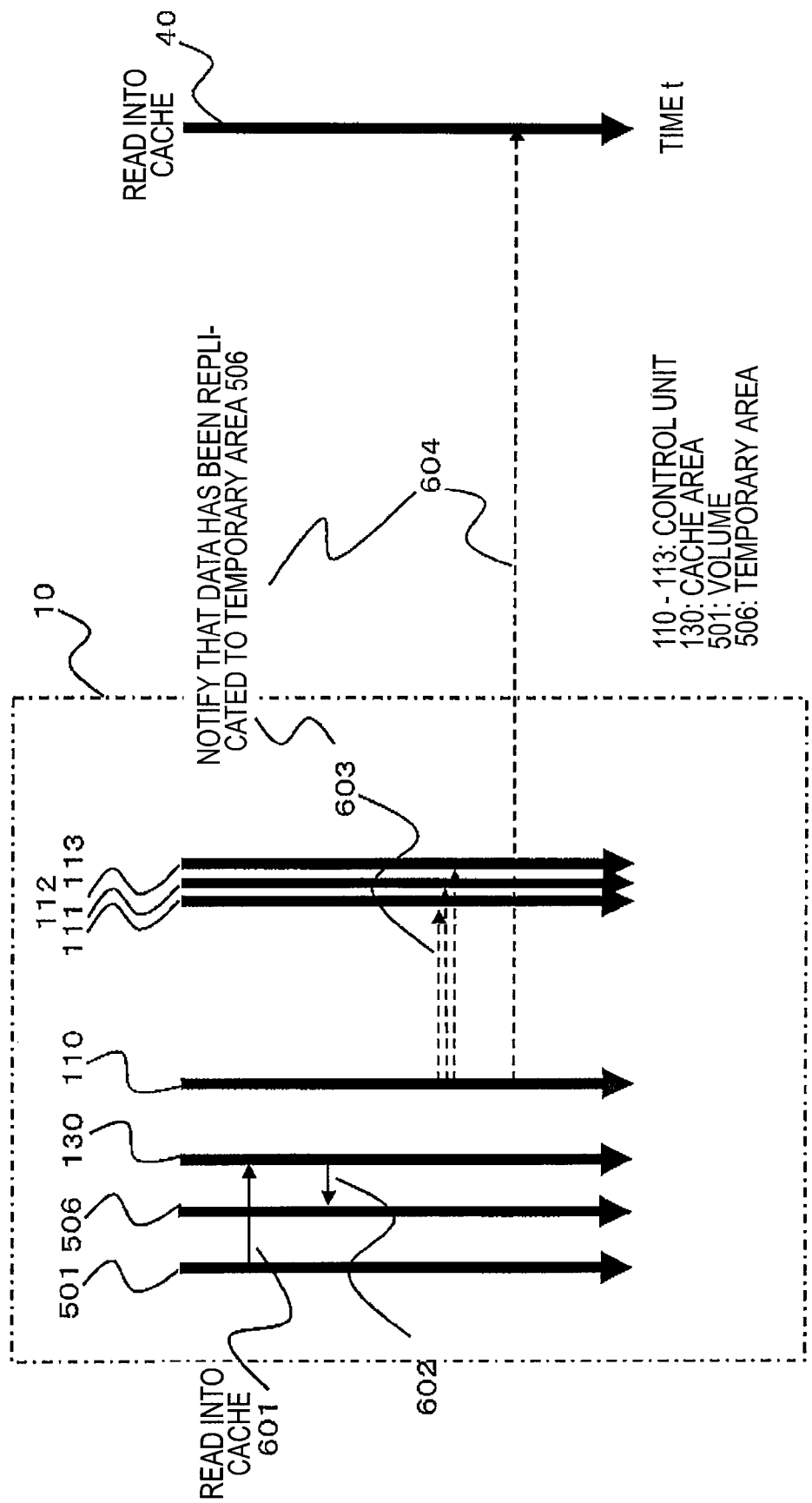
FIG. 6 is a view illustrating the processes of a data replication operation between the volumes 501 to 503 connected to one of the control units 110 to 113.

Next, a description of the content data replication process between the plurality of volumes 501 to 503 managed by the single control unit 110, which is triggered by the cache hit, will be provided. FIG. 6 is a sequence diagram illustrating the flow of creating replica of the content data between the plurality of volumes 501 to 503 managed by the single control unit 110, triggered by the cache hit.

The state where the content data on the volume 501 is read to the cache area 130 is initialized (step 601). At this time, when a cache hit occurs in response to the access from the terminal device 30, the content data on the cache area 130 is written to the temporary area 506 on the volume 502. This series of operations are performed by the data replication portion that is implemented by the control unit 110 executing the data replication program 143 on the memory 140.

The volume on which the data replication has been performed is managed by the replication target determination portion that is implemented by the control unit 110 executing the replication target determination program 144. In order for this to work, another control units 111 to 113 are also notified that the data replication has been performed on the volume 502 (step 603). Moreover, the portal server 40 performing the load balancing process is similarly notified that the replication has been performed (step 604). In this way, the respective control units 110 to 113 can hold information as to which content data is stored on which volume 501 to 503 of which storage device 120 to 123.

Moreover, the notification at step 604 is not limited to execution of communication between the control units 110 to 113 but may be implemented by a method of preparing a shared memory area shared by the control units 110 to 113 so that a later-described content data replica management table 700 is shared between the control units 110 to 113.

Figure 7:
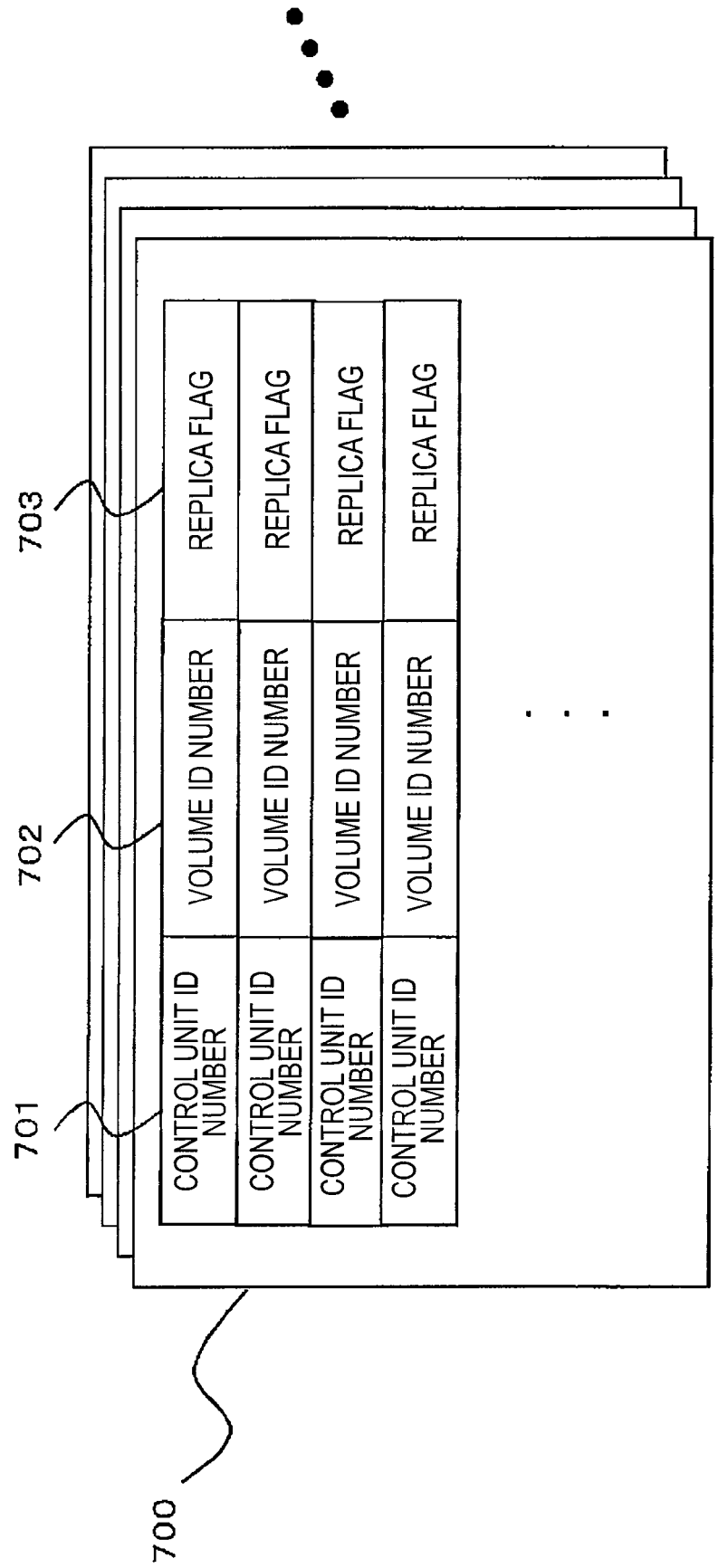
FIG. 7 is a view showing an example of a content data replica management table 700.

FIG. 7 shows an example of the content data replica management table 700 managed by executing the replication target determination program 144. The content data replica management table 700 is a table 700 which is created individually for each content data block stored in the disk drives 120 to 123.

Items recorded in the content data replica management table 700 include a control unit ID number 701, a volume ID number 702, and a replica flag 703. The control unit ID number 701 is an ID for uniquely identifying the respective control units 110 to 113. The volume ID number 702 is an ID for uniquely identifying the volumes 501 to 503 managed by the control unit 110 to 113. The replica flag 703 is a flag indicating for each of the volumes 501 to 503 identified by the volume ID number 702, as to whether the content data is replicated to the temporary areas 505 to 507 of the volume 501 to 503.

By referring to the content data replica management table 700, the replication target determination portion implemented by executing the replication target determination program 144 is able to distinguish between the temporary area 505 to 507 having the replica and the temporary area 505 to 507 without the replica.

The content data replica management table 700 may be maintained in the memory 140 or the disk drives 120 to 123, and alternatively, may be automatically configured on an as needed basis by metadata in which a file location on the disk is recorded.

Figure 8:
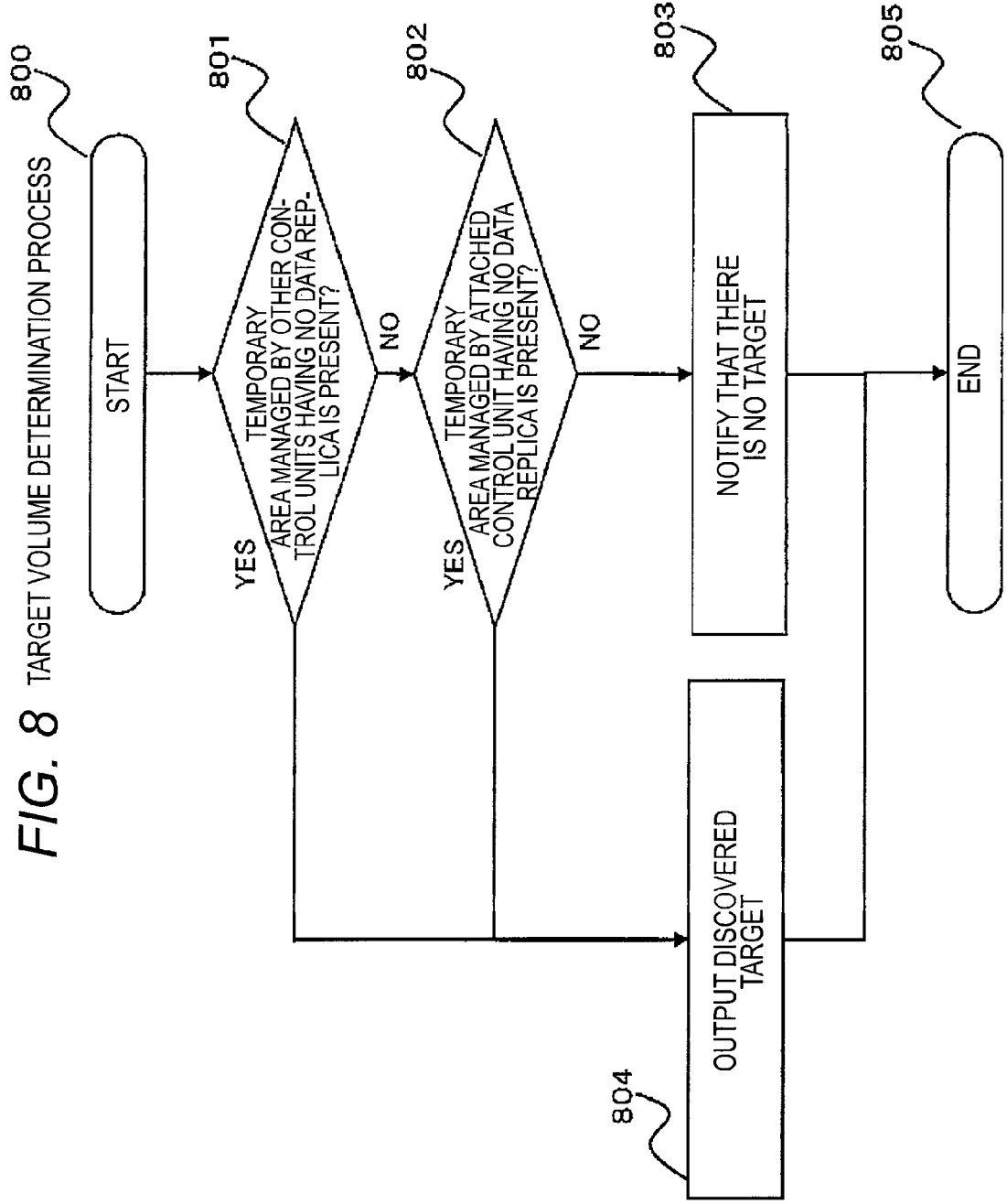
FIG. 8 is a view illustrating a target volume determination process.

Next, a description of a replication target volume selection process according to the present embodiment will be provided. FIG. 8 illustrates the flow of selecting the replication target volume by executing the replication target determination program 144. The replication of the content data is executed when triggered by the cache hit of the content data in the cache areas 130 to 133 managed by the control units 110 to 113, and the replication target volume selection process starts (step 800).

First, the replication target determination portion refers to the content data replica management table 700 stored at the above-described appropriated location to make a determination as to whether the volumes 501 to 503 managed by other control units 111 to 113 have the temporary area 505 to 507 without the replica (step 801).

If there is no available temporary area 505 to 507 (step 801: No), a determination is made as to whether the volumes 501 to 503 managed by the control unit 110 have the temporary area 505 to 507 without the replica (step 802). If neither of the volumes has available temporary area 505 to 507 (step 802: No), the control unit 110 is notified that there is no available replication target, and the replication is not performed (step 803). If available temporary area has been discovered (step 802: Yes), the temporary area 505 to 507 serving as the replication target is notified to the control unit 110, and the replication of the content data is performed (step 804).

Owing to the replication target volume selection process, it is possible to prevent identical content data blocks from being redundantly stored in the temporary areas 505 to 507 in which the content data block is already stored (replicated).

Next, a description of a cache hit management table 900 will be provided. FIG. 9 shows an example of the cache hit management table 900 managed by a cache management portion that is implemented by executing the cache management program 145. In the cache hit management table 900, information on a past use history of the respective content data blocks 303 is recorded. The cache management program 145 (cache management portion) sets the condition for starting the content data replication process and determines whether the content data replication process is to be started.

The cache management program 145 holds therein the cache hit management table 900, and items recorded in the cache hit management table 900 include a block number 901, the number of cache hits (hit times) 902, a measurement time 903, the rank of a cache hit rate (hit rate rank) 904, and an average of elapsed time (hit interval) 905.

The block number 901 is the number of a block corresponding to the cache area 130 to 133 set on the memory 140. The cache hit times 902 is the number of times that data written on a block identified by the block number results in a cache hit. The measurement time 903 is a measurement interval set to an appropriate length for counting the cache hit times 902, which is set to one second, for example. The cache hit rate rank 904 is the rank of cache hit rates per a unit time, that is, the value obtained by dividing the cache hit times 902 by the measurement time 903 when the values per unit time were sorted in the descending order of the block number. The average elapsed time 905 is an average of time elapsed after a previous cache hit and represents an average of time intervals at which the cache hit has occurred. The higher the cache hit rate rank 904 and the smaller the average elapsed time 905, the content data can be judged to be the popular one, which is frequently requested by the terminal device 30 to be delivered.

When the data replication is configured to be simply started when triggered by the occurrence of a cache hit, the data replication may be executed only when the hit times 902 has increased. The definition of the cache hit in the present invention may be customized by freely adjusting the condition accompanied with the cache hit according to the needs, such that the replication should be started when the hit times becomes n or more, the replication should only be started when the hit rate rank 904 is equal to or higher than a predetermined value, or the replication should be started when the hit interval 905 is equal to or smaller than a predetermined value.

Figure 10:
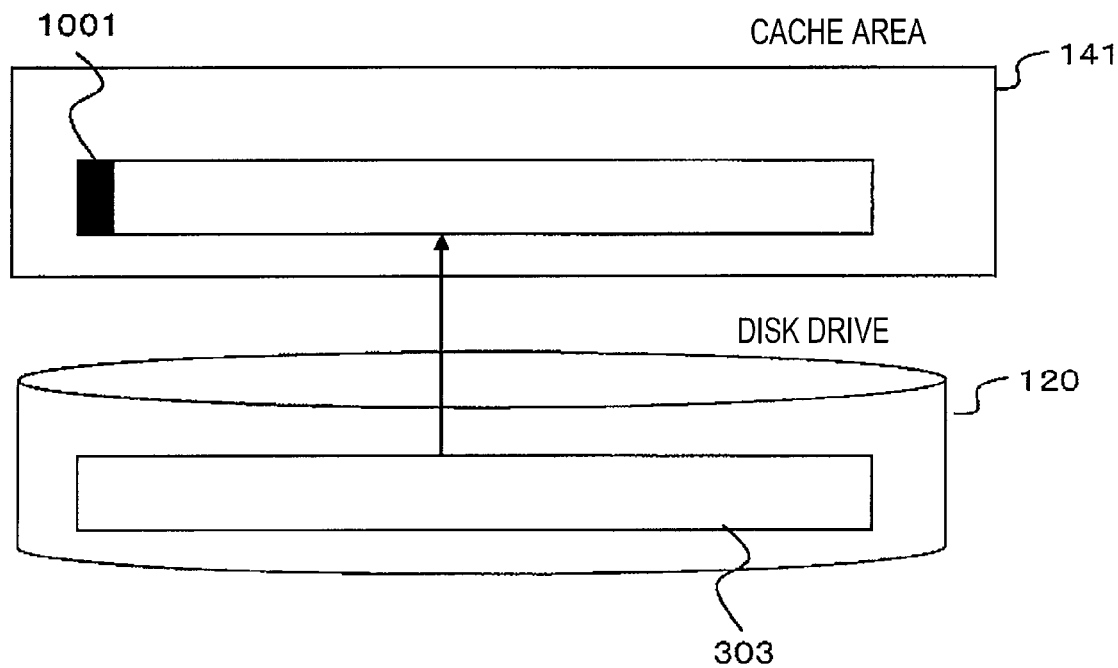
FIG. 10 is a view illustrating a process of replicating data using a file system.

Next, a description of the data replication process using a file system will be provided. Referring to FIG. 10, the flow of replicating data using the file system is schematically depicted. The content data 303 on the disk drive 120 is opened, as a file, by the control unit 110 and then read into the cache area 141 configured in the memory 140. At this time, when the same content data 303 is opened, as a file, in response to an additional access from another terminal device 30, a cache hit occurs because the content data 303 is already held in the cache area 141.

In this case, not only the cache hit block of the content data 303 but also the entire content data blocks 303 are subjected to the data replication process. If some of the content data blocks 303 are not yet held on the cache area 141, the data blocks are newly read from the disk drives 120 to 123 to be subjected to the data replication.

Generally, data held on the cache area 141 is overwritten with new data by an algorithm such as LRU. Since some content data 303 such as video data has a large data size, only parts of the data are left on the cache area 141. Therefore, there is a possibility that depending on the timing of a subsequent file open operation with respect to the content data 303, a cache hit does not occur, and thus, the data replication is not appropriately started.

In the present embodiment, in order to obviate such a problem, a starting block 1001 of a file constructing the content data is controlled to be preferentially left in the cache area 141. By controlling in such a manner, it can be expected that the cache hit rate increases because it is considered that particularly, in movie contents or the like, the starting block of the content data file is accessed first. Even in the case of content data which is not accessed from the start of a file, by employing a method in which it is checked whether the starting block 1001 of the file is in the cache area 141 when the content data file is opened, it is possible to attain a substantial improvement in the cache hit rate.

Figure 11:
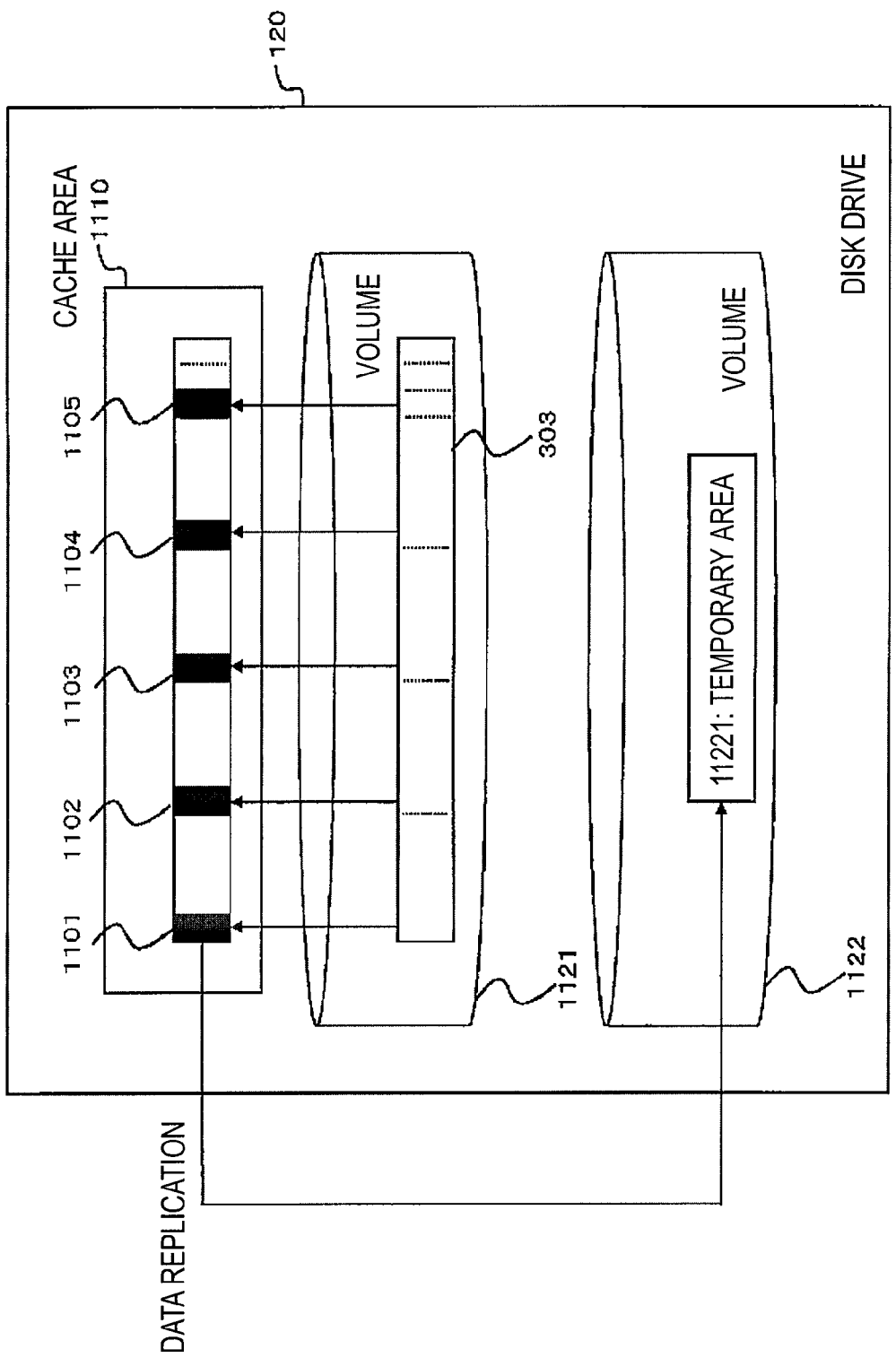
FIG. 11 is a view illustrating a process of replicating data without using the file system.

Next, a description of the data replication process without using the file system is provided. Referring to FIG. 11, the flow of replicating data without using the file system is schematically depicted. This data replication process without using the file system is suitable for a hardware-based implementation in which such a function is incorporated into the disk drive 120 to 123.

The content data 303 stored on the disk drive 120 having a plurality of volumes 1121 and 1122 is read into a cache area 1110 configured in a memory (not shown) mounted in the disk drive 120. When there is an access to the content data and thus a cache hit occurs, the content data is replicated to a temporary area 11221 configured in another volume 1122 in the disk drive 120.

However, since the file system is not used, for example, when a plurality of files is concurrently read, there is a problem that the processing overhead for determining and managing which block belongs to which file is large. In order to eliminate or obviate the influence of such a problem, the cache hit determination or the data replication process is performed for each extent size in which it is logically guaranteed that data is recorded in consecutive blocks. Similar to file-based data replication, the starting blocks 1101 to 1105 of each extent is controlled to be preferentially left in the cache area 1110, so that a cache hit occurs appropriately.

By allowing the disk drive 120 to perform extent-based data replication, the replication process implemented by executing the data replication program 143 needs only to check whether the entire extents have been replicated, and if there are lacking extents, to replicate only the extents. Therefore, it is possible to save the bandwidth required for data transmission between the disk drive 120 and the cache area 141 managed by the control unit 110 that manages the disk drive 120. In checking the presence of the lacking extents, a later-described file-extent correspondence management table 1200 is used which indicates the correspondence between files and extents.

Figure 12:
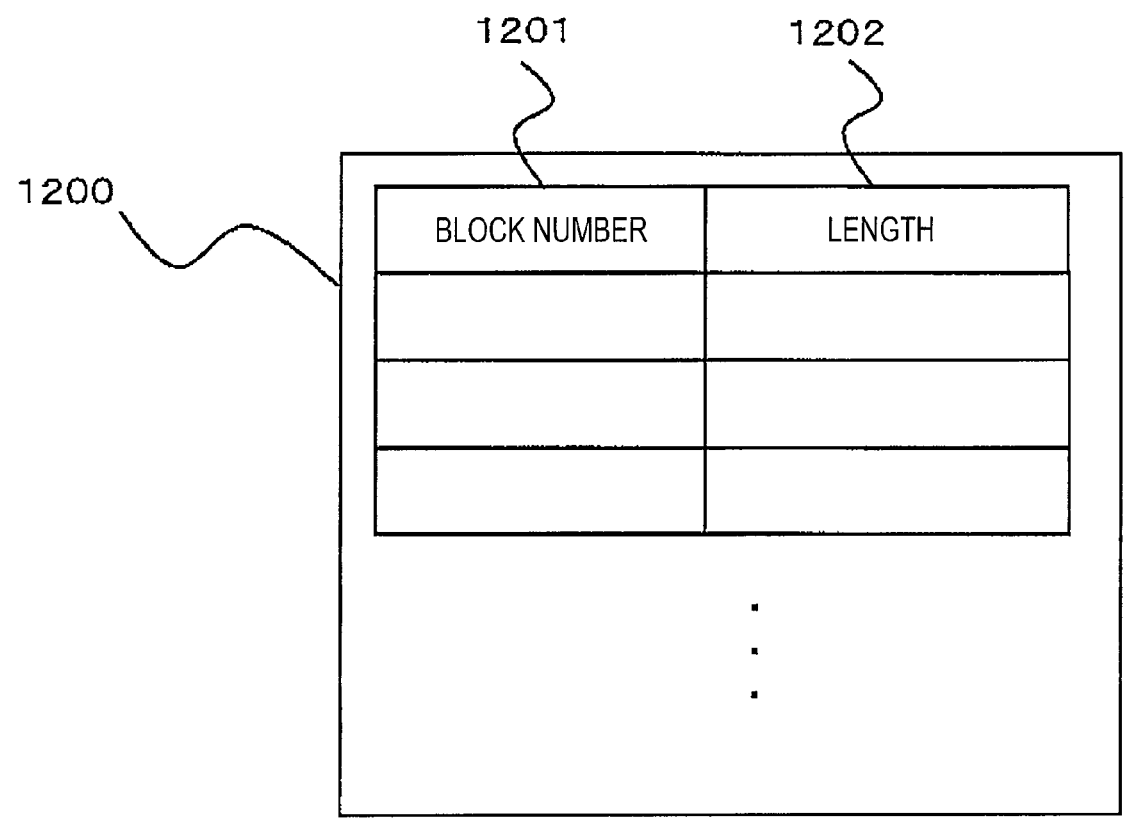
FIG. 12 is a view illustrating an example of a file-extent correspondence management table 1200.

Referring to FIG. 12, an example of the file-extent correspondence management table 1200 is shown. The file-extent correspondence management table 1200 is generated for each file, in which a block number 1201 assigned to a data block constructing a content data file and a length 1202 of a block identified by the block number 1201 are recorded. By recording the starting block number 1201 of each of the extents that construct a file and the block length 1202 being the extent size in a corresponding manner, it is possible to know which extents constructed each file.

Moreover, it is possible to save the cache area 1110 by using a table having the same format as the file-extent correspondence management table 1200. Even when data, such as the starting block 1101 to 1105 of a file, that is desired to be left in the cache area 1110 is unable to be left in the cache area 1110 due to shortage of free areas, by appropriating the file-extent correspondence management table 1200 to assume that the table is on the cache area 1110 and recording it as a list of block numbers 1201 from which the data replication starts, it is possible to achieve the same operation as if cache is actually processed.

Next, a description of the load balancing process by the portal server 40 will be provided. Referring to FIG. 13, an access status management table 1300 is illustrated which is held by the load balancing program 44 executed on the portal server 40 by the control unit 42.

Items recorded for each delivery apparatus address 1301 in the access status management table 1300 include a contents list 1302 indicating contents that can be delivered from an access target, a bit rate list 1303 for each contents, an available delivery bandwidth 1304 of the access target, and the number of accesses 1305 for each contents at the access target.

The contents list 1302, the bit rate list 1303 for each contents, the available delivery bandwidth 1304 of the access target, and the number of accesses 1305 for each content at the access target are periodically notified to the portal server 40 from the control unit 110 to 113 of the contents delivery apparatus 10 to which the delivery apparatus address 1301 is assigned, and the access status management table 1300 is updated in a corresponding manner.

The load balancing process by the portal server 40 is implemented by the control unit 42 selecting an access target having the most available delivery bandwidth from among the access targets capable of delivering the contents requested by the terminal device 30 by referring to the access status management table 1300 when the load balancing program 44 is executed.

Figure 14:
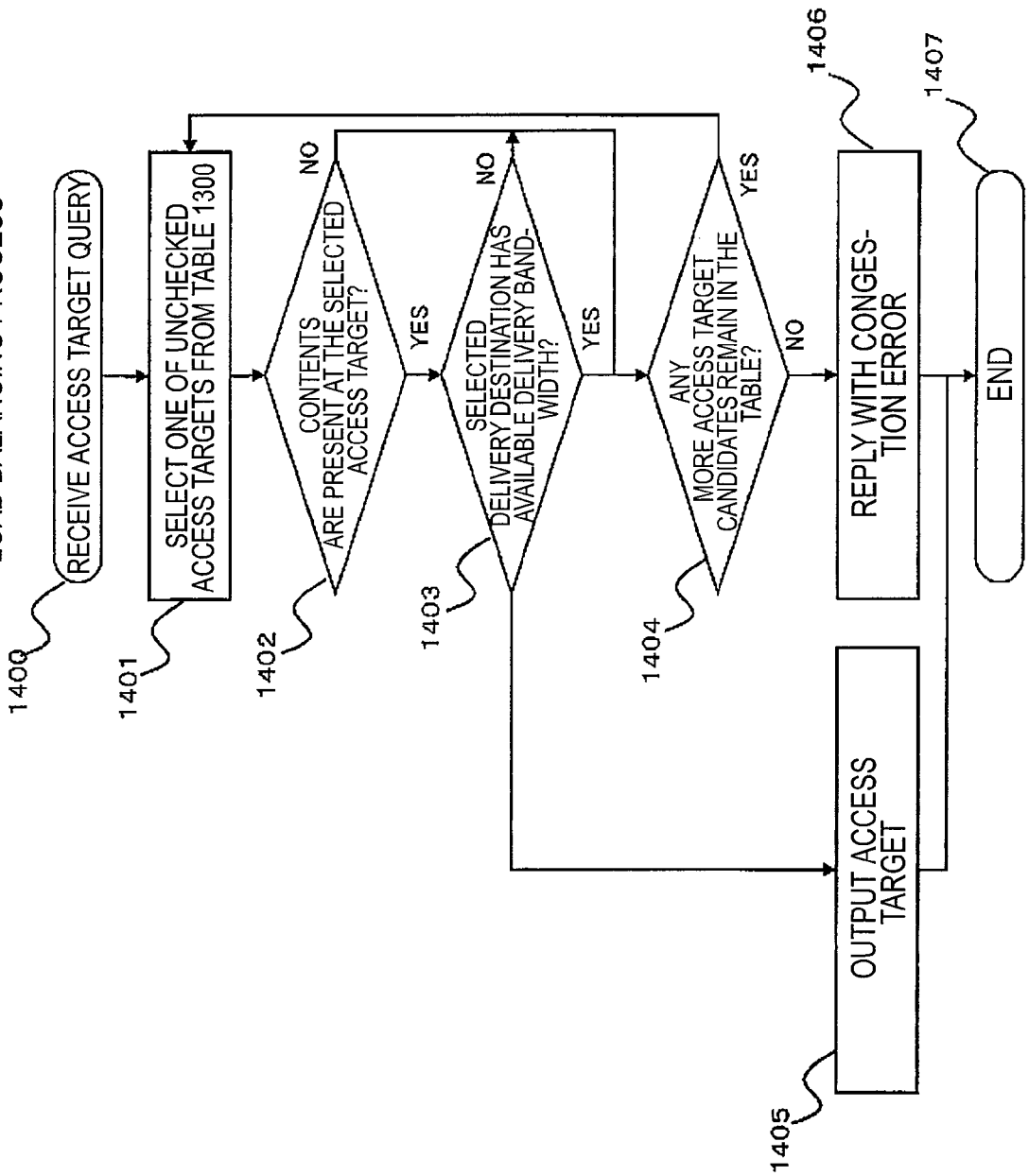
FIG. 14 is a view illustrating a load balancing process performed by a portal server 40.

Next, a description of the flow of the load balancing process performed by the portal server 40 will be provided. Referring to FIG. 14, an example flow of the load balancing process is illustrated. First, where there is an access target query from the terminal device 30 (step 1400), the control unit 42 selects one access target from the access status management table 1300 (step 1401).

A determination is made as to whether the contents requested by the terminal device 30 are present in the selected access target (step 1402), and when the contents are present (step 1402: Yes) and when there is available delivery bandwidth (step 1403: Yes), the selected access target is notified to the terminal device 30 (step 1405). The availability check on the delivery bandwidth is performed by comparing the bit rate of the contents which were requested by the terminal device 30 to deliver with the available delivery bandwidth of the control unit 110 to 113 of the access target.

When the contents are not present in the contents delivery apparatus 10 of the access target (step 1402: No), or when the contents delivery apparatus 10 does not have available delivery bandwidth (step 1403: No), and when there is any unchecked access target, the process returns to step 1401 to select a subsequent access target, and the operations of steps 1402 and 1403 are repeated. When it is determined as a result of checking the entire access targets that it was unable to select the access target satisfying the conditions (step 1404: No), the control unit 42 sends an error message to the terminal device 30 that has requested the contents, thereby notifying that neither of the contents delivery apparatus 10 is able to deliver the requested contents due to congestion (step 1406).

Moreover, at step 1406, when there is a room for increasing the number of access target candidates by replication of the content data, an instruction to forcibly prompt the replication of the content data may be sent to the contents delivery apparatus 10 in addition to the error notification to the terminal device 30. By doing this, it may be possible to obviate a situation where it is unable to deal with the contents delivery request from the terminal device 30.

Next, a description of a data replication process in which data having been replicated from a disk drive 120, in which it was originally stored, to another disk drive 121 is replicated again to another disk drive 122 will be provided. Referring to FIG. 15, an example flow of the case where data having been replicated to the temporary area 126 of the disk drive 121 managed by the control unit 111 in accordance with the flow shown in FIG. 4 is replicated again to another disk drive 122 is illustrated.

The state where the content data 303 stored in the temporary area 126 of the disk drive 121 is read into the cache area 131 of the memory 140 is initialized (step 1501).

When the content data 303 stored in the cache area 131 in response to the request from the terminal device 30 results in a cache hit, the control unit 111 sends a query request to the control unit 110 serving as the replication source of the content data 303 for the contents replication target (step 1502).

Upon acquisition of information identifying the temporary area 127 serving as the replication target from the control unit 110 (step 1503), the control unit 111 instructs the control unit 112 that manages the disk drive 122, in which the temporary area 127 is configured, to perform a data replication process (step 1504). Querying the control unit 110 for the replication target is to allow the control unit 110 in which the content data 303 was originally stored to always execute the replication target determination process (FIG. 8), thereby preventing redundant execution of the replication target determination process by other control units 111 to 113.

The control unit 112 replicates the content data 303 from the cache area 131 to the cache area 132 (step 1505), and the replicated content data 303 is written to the temporary area 127 of the disk drive 122 (step 1506). Upon completion of the replication of the content data 303, the control unit 112 notifies the control unit 111 of the replication completion (step 1507). Upon receiving the notification, the control unit 111 notifies the control unit 110 of the completion of the replication of the content data 303 (step 1508). Although not shown in the drawing, the replication completion notification may be sent to the control unit 113.

Moreover, the control unit 112 notifies the portal server 40 that the replication of the content data 303 has been completed (step 1509). Furthermore, the replication completion notification at steps 1507 to 1509 may be sent prior to the completion of the data replication.

Next, a description of a process of replicating data between the control units 110 to 113, the data being held in the cache area 131 to 133 managed by the control units will be provided. Referring to FIG. 16, the flow of replicating the content of the cache area 131 to 133 between the control units 110 to 113, as disclosed above in connection with the steps 403 and 404 in FIG. 4, is illustrated.

When data is simply replicated between different cache areas 131 to 133, it may result in inter-memory copies, which may increase the load of the control units 110 to 113, and it is thus undesirable. Therefore, the present embodiment solves such a problem, for example, by using a virtual storage function implemented as one of the functions of the control units 110 to 113.

In the virtual storage function, a physical memory 1600 is managed in units of pages 1601. By arbitrarily assigning the pages 1601 to virtual storage areas, a virtual memory 1602 is obtained. For example, when a page 1604 of the virtual memory 1602 is newly accessed, the page 1604 is assigned with an unused page 1603 of the physical memory 1600.

When data stored in a page 1606 of the cache area 130 is replicated to a page 1607 of the cache area 131, if the physical memory 1600 corresponding to the page 1606 is a page 1605, by assigning the page 1605 of the physical memory 1600 being an actual address to the pages 1606 and 1607 being a virtual address, it is possible to replicate the data between the cache areas 130 to 133 without the necessity of physically replicating the data stored in the page 1605 serving as the replication source.

In the information processing system 1 according to the present embodiment, although the contents delivery apparatus 10 and the portal server 40 are configured as separate apparatuses, one of the control units 110 to 113 of the contents delivery apparatus 10 may be used as the control unit 42 of the portal server 40.

Moreover, in the present embodiment, although the disk drives 120 to 123 are incorporated into the contents delivery apparatus 10, a configuration may be employed in which the contents delivery apparatus 10 serving as a host is connected to the disk drives 120 to 123 via a network such as SAN (Storage Area Network).

Furthermore, in the present embodiment, although a single contents delivery apparatus 10 is connected to the portal server 40, a plurality of contents delivery apparatuses 10 may be connected to a single portal server 40.

Furthermore, in the present embodiment, although the data replication program 143, the replication target determination program 144, and the cache management program 145 are executed by the control unit 110 to 113 of the contents delivery apparatus 10, a part or the entirety of the processes implemented by the program elements may be executed by the control unit 42 of the portal server 40.

Furthermore, although the present embodiment aims to eliminate a resource distribution loss resulting from disk performance shortage occurring during contents delivery, the object of the present invention is not limited to this. The present invention can be suitably used, for example, for a monitoring system that receives video data sent from a network and records the data in a disk drive.

According to the above-described embodiment of the present invention, since it is possible to automatically detect popular content data by using the cache hit as a trigger, it is possible to replicate the content data to another disk drive prior to occurrence of disk read performance shortage to thereby prevent a resource distribution loss due to the presence of multiple control units.

Hereinabove, although the present invention has been described with respect to the embodiments by referring to the accompanying drawings, the present invention is not limited to the embodiments. Moreover, it should be understood that modifications and equivalents thereof without departing from the spirit of the present invention fall within the scope of the present invention.

What is claimed is:

1. An information processing system, comprising:
   an information processing apparatus operable to receive a data send request from an external device and send a target data of the data send request to the external device, the information processing apparatus including a plurality of control devices, each comprising:
   a storage device configured to store therein the target data of the data send request;
   a control unit configured to receive the data send request from the external device, read out the target data of the data send request from the storage device to which the control unit is assigned, and send the target data to the external device; and
   a cache memory configured to temporarily store therein at least a part of the data which the control unit has read from the storage device; and
   a management device operable to receive the data send request from the external device and assign the control device, in which the target data of the data send request is stored, as a data send request destination of the external device,
   wherein upon receipt of the data send request from the external device, the control unit makes a determination as to whether the at least a part of the target data of the data send request results in a cache hit in the cache memory, replicates data associated with the target data stored in the storage device to another storage device assigned to another control unit when the determination result indicates the cache hit, and notifies the management device that the associated data has been replicated to the another control device.

2. The information processing system according to claim 1, wherein the management device acquires information on a load state from each of the control units of the information processing apparatus, and upon receipt of the data send request from the external device, selects the control device serving as the data send request destination based on the information on the load state of the control device in which the target data is stored.

3. The information processing system according to claim 1, wherein the information on the load state, acquired by the management device includes at least one of a bit rate of the target data of the data send request, a bandwidth available for data transmission in the control device serving as the data send request destination, and the number of accesses to the target data made in the data send request destination.

4. The information processing system according to claim 1, wherein the target data of the data send request is delivered in a streaming manner to the external device being a data send request source.

5. The information processing system according to claim 1, wherein prior to performing the operation of replicating the associated data to the another storage device of the another control device from the storage device assigned thereto, the control unit makes a determination as to whether the associated data is already stored in the another storage device, and when it is determined that the associated data is not stored in the another storage device, selects the another storage device as a replication target of the associated data.

6. The information processing system according to claim 5, wherein when it is determined that the associated data is stored in the another storage device, the control unit makes a determination as to whether the storage device assigned thereto has a storage area in which the associated data is not stored, and when it is determined that the storage device has the storage area, selects the storage area as a replication target of the data.

7. The information processing system according to claim 1, wherein prior to completion of the operation of replicating the associated data to the another storage device from the storage device, the control device notifies the management device that the associated data has been replicated to the another storage device.

8. The information processing system according to claim 1, wherein the determination as to whether the target data of the data send request results in a cache hit in the cache memory, performed by the control unit upon receiving the data send request from the external device is made based on information on a use history of the target data of the data send request.

9. The information processing system according to claim 8, wherein the information on the use history of the target data of the data send request includes at least one of the number of times that the data results in a cache hit in the cache memory, the number of cache hits per a predetermined unit time, and an average time interval at which the data results in a cache hit.

10. The information processing system according to claim 1, wherein in the determination as to whether the target data of the data send request results in a cache hit in the cache memory, performed by the control unit upon receiving the data send request from the external device, when a predetermined block contained in the data results in a cache hit, the entire files associated with the data in which the block is contained are replicated.

11. The information processing system according to claim 1, wherein upon receipt of the data send request from the external device, the control unit makes a determination as to whether the target data of the data send request results in a cache hit in the cache memory and replicates the associated data to another storage device when the determination result indicates the cache hit, the associated data having been replicated from the storage device to the another storage device.

12. The information processing system according to claim 1, wherein the operation of replicating the associated data from the storage device to the another storage device is executed by the another control unit to which the another storage device is assigned.

13. The information processing system according to claim 1, wherein the another storage device has configured therein a temporary storage area which is a storage area for temporarily storing the data, and the associated data is replicated to the temporary storage area.

14. A management method of an information processing system, comprising:
   an information processing apparatus operable to receive a data send request from an external device and send a target data of the data send request to the external device, the information processing apparatus including a plurality of control devices, each comprising:
   a storage device configured to store therein the target data of the data send request;
   a control unit configured to receive the data send request from the external device, read out the target data of the data send request from the storage device to which the control unit is assigned, and send the target data to the external device; and a cache memory configured to temporarily store therein at least a part of the data which the control unit has read from the storage device; and a management device operable to receive the data send request from the external device and assign the control device, in which the target data of the data send request is stored, as a data send request destination of the external device, wherein upon receipt of the data send request from the external device, the control unit makes a determination as to whether the at least a part of the target data of the data send request results in a cache hit in the cache memory, replicates data associated with the target data stored in the storage device to another storage device assigned to another control unit when the determination result indicates the cache hit, and notifies the management device that the associated data has been replicated to the another control device.

15. A contents delivery system, comprising:

a contents delivery apparatus operable to receive a content data delivery request from an external device and deliver a target content data of the content data delivery request to the external device, the contents delivery apparatus including a plurality of control devices, each comprising:

a disk drive configured to store therein the content data;

a control unit configured to receive the content data delivery request from the external device, read out the target content data of the content data delivery request from the disk drive, and send the target content data to the external device; and a cache memory configured to temporarily store therein at least a part of the content data which the control unit has read from the disk drive; and a contents delivery request assigning device operable to receive the content data delivery request from the external device and assign the control device, in which the target content data of the content data delivery request is stored, as a content data delivery request destination of the external device, wherein upon receipt of the content data delivery request from the external device, the control unit makes a determination as to whether at least a part of the target content data of the content data delivery request results in a cache hit in the cache memory, replicates the target content data from the disk drive assigned thereto to another disk drive assigned to another control unit when the determination result indicates the cache hit, and notifies the contents delivery request assigning device that the content data has been replicated to the another control device, and wherein the contents delivery request assigning device acquires information on a load state from each of the control units of the contents delivery apparatus, and upon receipt of the content data delivery request from the external device, selects the control device serving as the content data delivery request destination based on the information on the load state of the control unit to which the disk drive is assigned in which the content data is stored.

* * * * *